Aug. 2, 1949.  P. F. SMITH  2,477,907
PARACHUTE ZERO SPEED LANDING MOTOR
Filed Sept. 4, 1944  4 Sheets-Sheet 1

INVENTOR.
Prevost F. Smith

Aug. 2, 1949.  P. F. SMITH  2,477,907
PARACHUTE ZERO SPEED LANDING MOTOR
Filed Sept. 4, 1944  4 Sheets-Sheet 2

INVENTOR.
Prevost F. Smith

Aug. 2, 1949.　　　　P. F. SMITH　　　　2,477,907
PARACHUTE ZERO SPEED LANDING MOTOR
Filed Sept. 4, 1944　　　　　　　　　　　　4 Sheets-Sheet 3
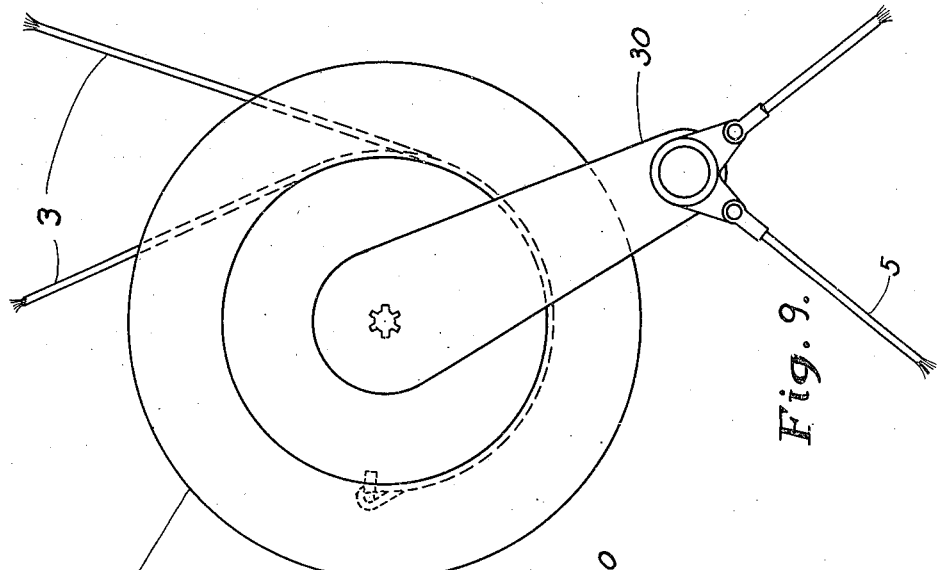
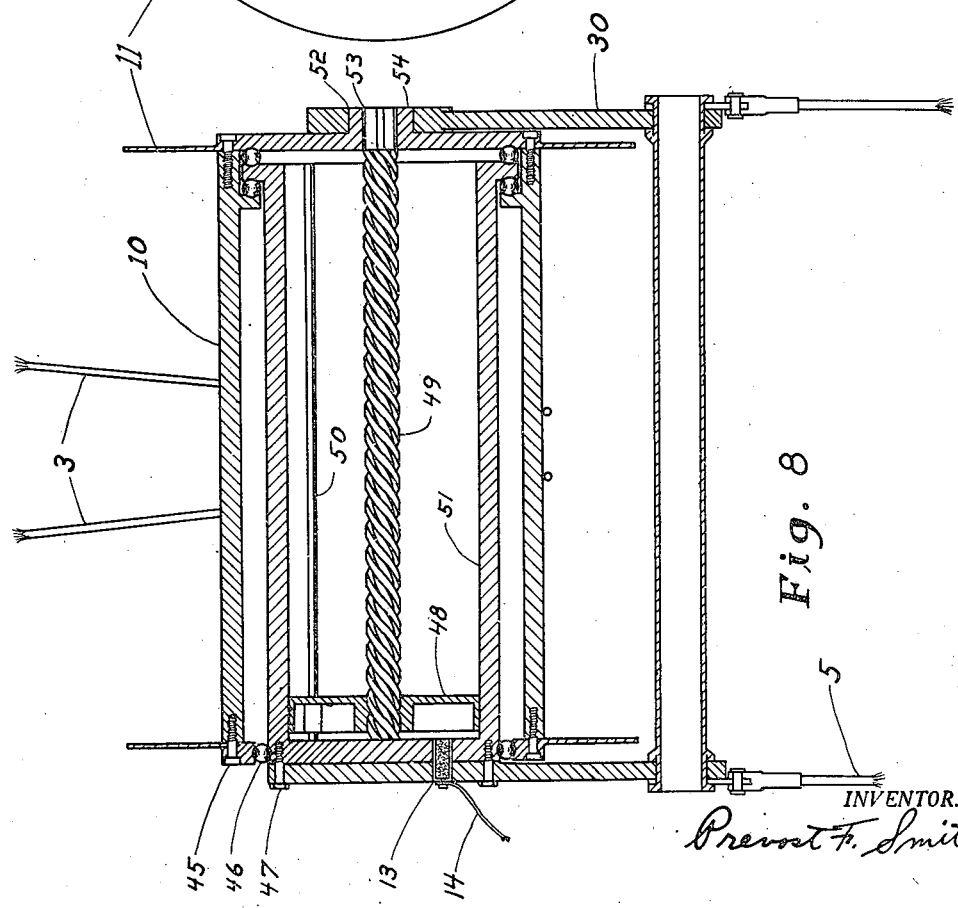
INVENTOR.
Prevost F. Smith

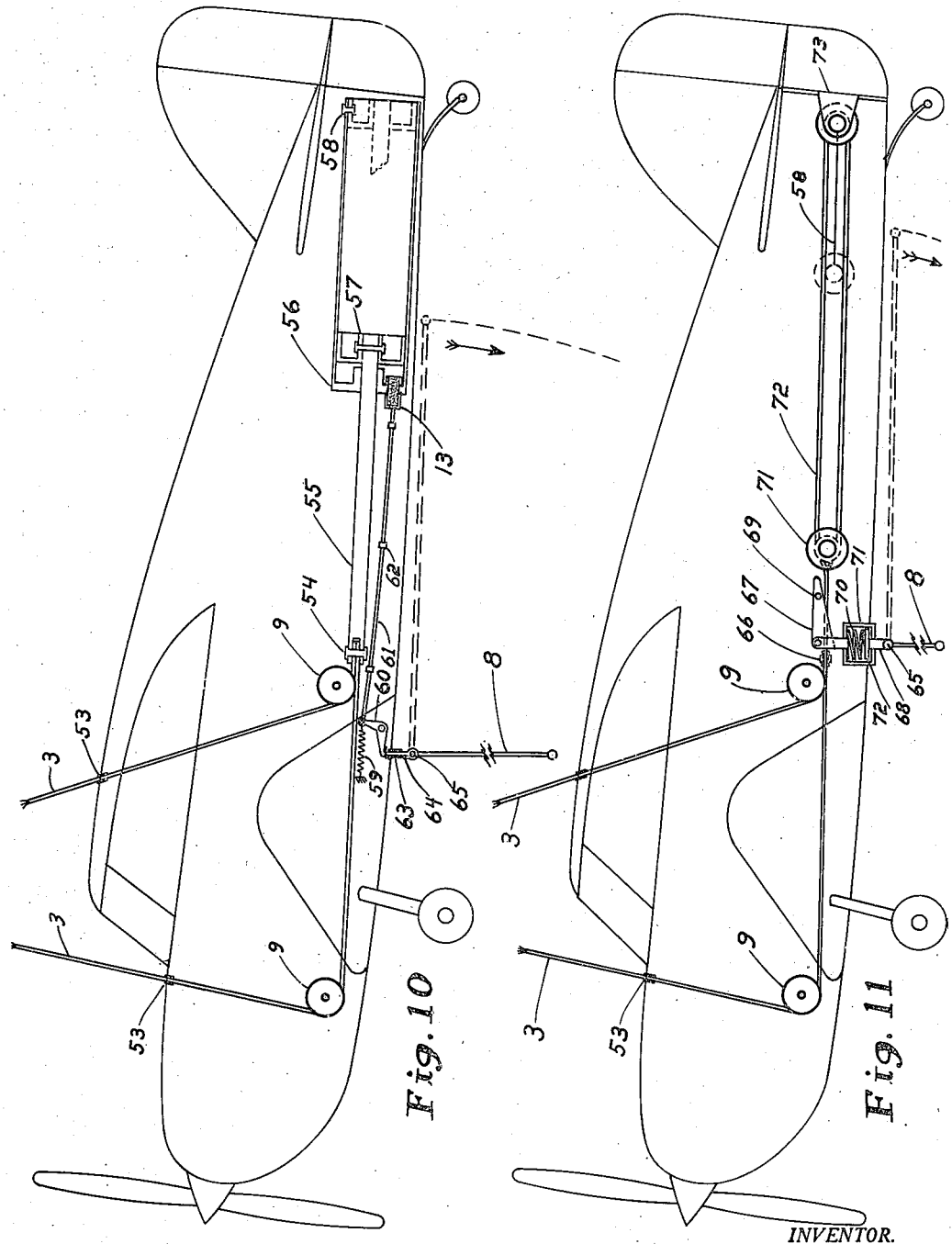

Patented Aug. 2, 1949

2,477,907

UNITED STATES PATENT OFFICE 2,477,907

PARACHUTE ZERO SPEED LANDING MOTOR

Prevost F. Smith, Pacific Beach, Calif.

Application September 4, 1944, Serial No. 552,655

6 Claims. (Cl. 244—138)

1

My invention relates to a parachute zero speed landing motor more particularly for use in connection with parachute and cargo for reducing the landing speed of said cargo in connection with said parachutes when nearing the ground and the objects of my invention are:

First, to provide a landing motor of this class which tends to elevate the cargo in connection with the parachute when nearing the ground, increasing the speed of said parachute and lowering the speed of said cargo;

Second, to provide a landing motor of this class which may be arranged conveniently in interconnecting relation with the cargo and the parachute;

Third, to provide a landing motor of this class having contact means disposed a certain distance below the cargo connected to said landing motor for initiating the operation of said landing motor when said cargo nears the ground;

Fourth, to provide a landing motor of this class in which a gas producing cartridge is used for generating motive power which is delivered to means interconnecting the parachute and the cargo for slowing down the landing speed of said cargo when nearing the ground;

Fifth, to provide a landing motor of this class which is very compact in proportion to its utility;

Sixth, to provide a landing motor of this class having great power in proportion to its size; and, Seventh, to provide a landing motor of this class which is very simple and economical of construction, efficient in its action and which will not readily deteriorate or get out of order.

Figure 1:
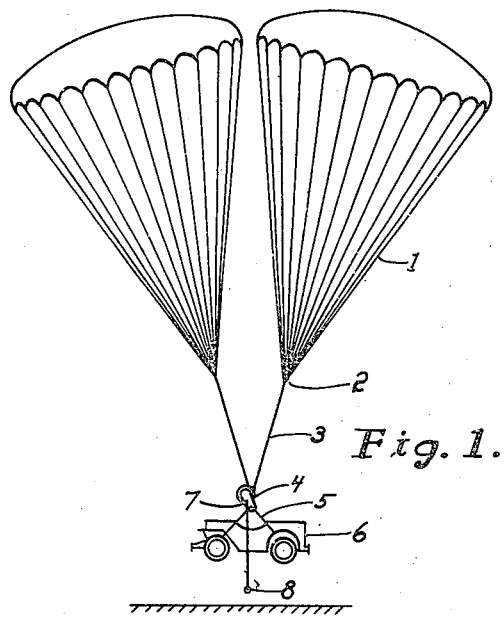
Figure 2:
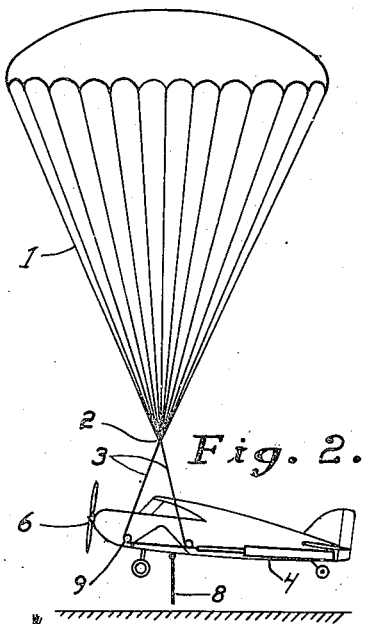
Figure 3:
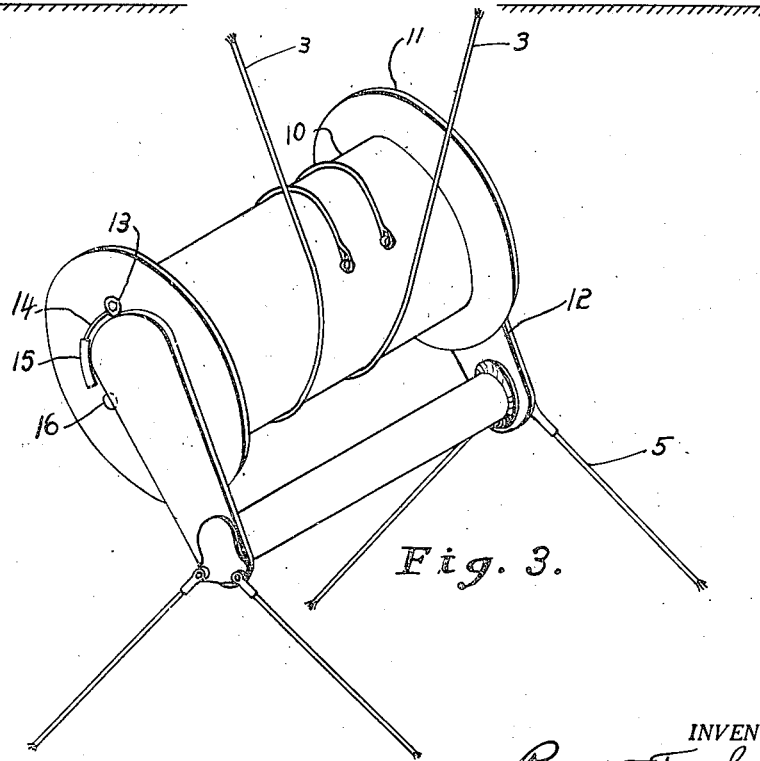
Figure 4:
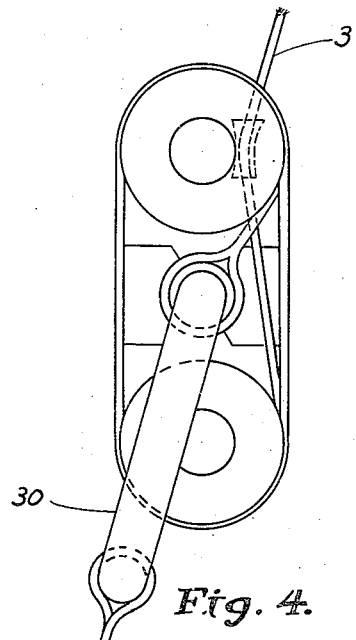
Figure 5:
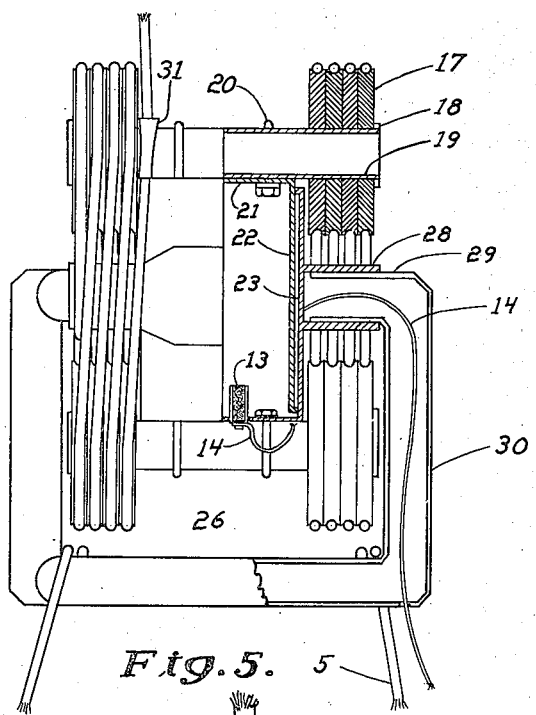

With these and other objects in view as will appear hereinafter, my invention consists of certain novel features of construction, combination and arrangement of portions as will be hereinafter described in detail and particularly set forth in the appended claims, reference being had to the accompanying drawings and to the characters of reference thereon forming a part of this application in which:

Figure 1 is a side elevational view of my parachute zero speed landing motor shown arranged in interconnecting relation with parachute and cargo supported thereby; Fig. 2 is a similar view showing the use of a modified form of my landing motor in connection with the cargo and parachute; Fig. 3 is an enlarged perspective view of my landing motor as shown in Fig. 1 of the drawing; Fig. 4 is a side elevational view of a modified form of my landing motor; Fig. 5 is a side elevational view of my

Figure 6:
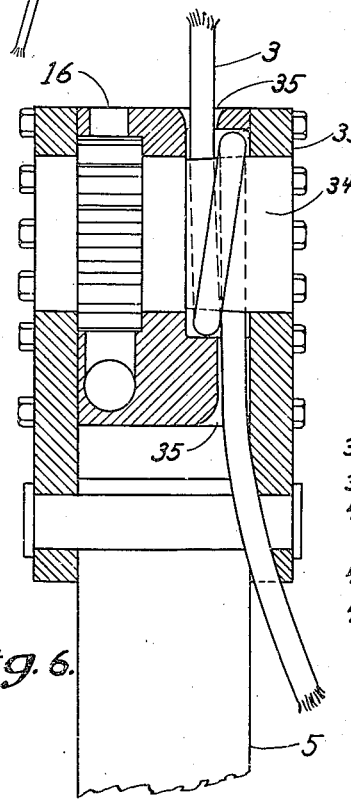
Figure 7:
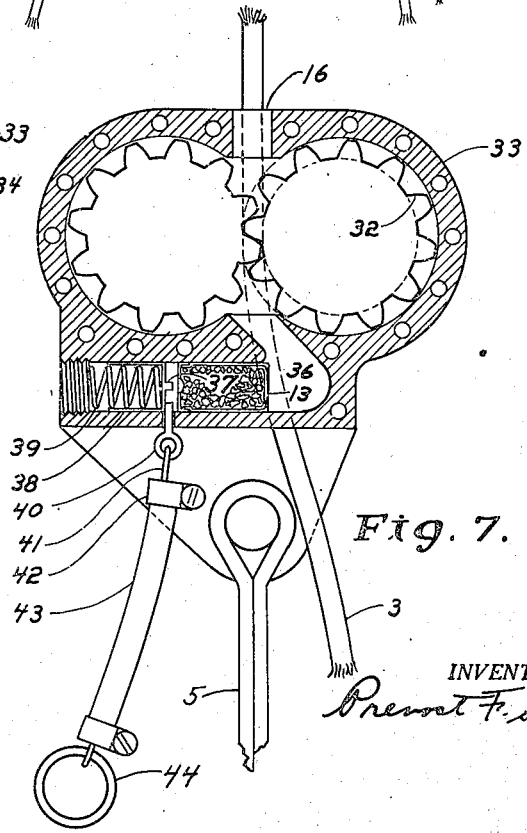

2 landing motor taken at right angles to that as shown in Fig. 4 showing portions broken away and in section to amplify the illustration; Fig. 6 is a cross sectional view of another modified form of my landing motor; Fig. 7 is a sectional view taken from the line 7 of Fig. 6; Fig. 8 is an enlarged longitudinal sectional view of my landing motor as shown in Fig. 1 of the drawing; Fig. 9 is an end view thereof as shown in Fig. 8 of the drawing; Fig. 10 is a view similar to Fig. 2 showing the airplane and my landing motor on a large scale and Fig. 11 is a similar view to Fig. 10 showing a modified form of landing motor in connection with the airplane cargo. Similar characters of reference refer to similar parts and portions throughout the several views of the drawing.

As shown in Fig. 3 of the drawing, cables 3 are wound around the drum 10 and intermediate the guide 11 and are connected to parachute 1 as shown in Fig. 1 of the drawing. Cables 5 in connection with the arms 12 are connected to the cargo 6 as shown in Fig. 1 of the drawing. The switch member 8, as shown in Fig. 1 of the drawing, extends below the cargo 6 and is connected to the landing motor in cooperative relation with one of the arms 12. It will be noted that the drum 10 revolves relatively to the arms 12 and the ignition wire 14 is attached to the insulated metal strips 15, which is positioned so that electric current from switch 9 can flow through it by means of a brush on the arms 12. Referring to Fig. 5 of the drawing, the suspension cables 3, through guides 31, are around the pulleys 17 held in place on the shafts 19 by ends 18. The shafts are fastened to closed ends 21 of telescoping tubes 22 and 23 by U bolts 20. When the cartridges 13 are fired by suitable means such as an electrical wire running to the switch member 8, the tubes 22 and 23 are extended pulling the cables 3. Also for convenient means of rolling up the parachute lines in the space 26, tubes 28 are fastened to the cylinder 23 and a frame 30 with the extension 29 within the tubes 28 forming bearings so that the assembly of tubes 22 and 23 and pulleys and shafts 17 and 18 can rotate thereby winding in the suspension lines for packing.

Referring particularly now to Figs. 6 and 7, the suspension cable is pulled in by the rollers 34 which are actuated by the ignition of a cartridge 13 driving gears 32 through a passage 36 and exhausting through 16. The moving parts are enclosed in a housing 33 which contains suitable guides 35 for the cable 3. A firing pin 37 restrained by a lock 40 under pressure from a spring 39 is within its own housing 38. The release of the pin 40 by the wire 41, attached to the ring 44 running through a metal housing 43 is clamped by clamp 42 at both ends so that the pin 40 cannot accidentally be released. Housing 33 is attached to the cargo by the cable 5. This landing motor as shown in Figs. 6 and 7 is particularly adapted for use in connection with life saving parachutes where weight and size must be kept to a minimum.

As shown in Fig. 8, the piston 48, traveling in a cylinder 51, is prevented from rotating by keys 50. The piston 48 is bored with a spiral groove to match the spiral shaft 49 which is fixed to the drum 10 through guides 11, bolts 45, hub 54 containing a spline 53 so that the hub 54 is fixed with the spiral shaft 49. The assembly of the drum and guides is free to rotate on cylinder 51 by means of anti-friction bearings 46. The cylinder 51 is fixed to a frame 30 with bolts 47 on the one side. A bearing 52 allows the drum assembly to turn freely in the frame 30, thus when the cartridge 13 is fired by a wire 14 or other suitable means, the piston 48 is driven through the cylinder 51 forcing the spiral shaft 49 and the drum assembly to rotate thereby pulling in the suspension cables 3 as required so as to effect a safe landing in which the landing speed is reduced to a minimum.

As shown in Fig. 10 of the drawing, the assembly of the parts used to pull in the suspension cables 3 run over fixed pulleys 9 in connection with the cargo in this modified form of landing motor the length and stroke of the piston 57 requires considerable space, thus the modified form of landing motor as shown in Fig. 10 of the drawings is particularly adapted for use in connection with long cargoes; such as, aircraft in which the landing motor can be positioned longitudinally of the fuselage. In the cylinder 56 attached to the cargo is a piston 57, with a rod 55 attached to the suspension cables 3 with a bolt 54, said rod passes through a guide in the cylinder and is fastened to the piston 57. In a normal retracted position a break pin 58 holds the piston and cables snug and relies on the opening shock of the parachute to break the pin 58 releasing the piston 57 so that it can travel to the forward end of the cylinder ready for a working stroke. The automatic releasing means 8 is a light rod and from its stowed position is released to swing down and extend below the cargo a proper distance. When it hits the ground, it is strong enough to move the bellcrank 60 before it buckles. Shaft 64 passing through the cylinder 63 is connected to the switch member 8 at a hinge 65, the bellcrank 60 held by a spring 59, thus the shaft 61 is driven in the guides 62 against the cap in the cartridge 13, firing it and driving the piston 57 retracting the suspension cables 3 for effecting a safe landing of the cargo.

Referring particularly to Fig. 11 of the drawing, the suspension cables 3 passing over the pulleys 9 are attached to a bar 71 holding multiple rubber cords 72 which are stretched by the shock load imposed when the parachute opens. The spring latch 67, held in position by a fixed pin 69 engages clamps 66 on the cables 3 preventing the return of the elastic means. The automatic releasing means 8 is a light rod, released from its stowed position to swing down and extend below the cargo a proper distance. When it hits the ground it is strong enough to drive a straddle bar 68 with a washer 72 against the force of springs 70 enclosed in a fixed cylinder 71 releasing the latch 67 so that the potential energy stored in the elastics members 72 will pull the suspension cables 3 in, thereby, effecting a safe slow landing of the cargo. It will be noted that the hinge pin 65 is designed to lock the switch member 8 in a downward position.

Generally the operation of my parachute zero speed landing motor is substantially as follows:

Certain of the operations in connection with various modifications of my landing motor have been hereinbefore described in connection with the figures representing the same.

As the cargo, in connection with my landing motor and parachute, nears the ground the switch member 8 contacts the ground and causes my landing motor to operate tending to retract the suspension cables 3 toward the cargo, thus increasing the speed of the parachute and imposing a resultant reduction of velocity of the cargo whereby said cargo is slowed to a minimum velocity as it reaches the ground.

Though I have shown and described a particular combination and arrangement of parts and portions and certain modifications I do not wish to be limited to the particular construction, combination and arrangement or to the modifications but desire to include in the scope of my invention the construction, combination and arrangement substantially as set forth in the appended claims.

Having thus described my invention, what I claim as new and desire to secure by Letters Patent is:

1. In a landing motor of the class described the combination with a cargo of suspension cables, a piston rod in connection with said suspension cables, a piston in connection with said piston rod, a cylinder for said piston, a gas producing cartridge at one end of said cylinder at one side of said piston and release means including a rod connected with said cargo for contacting the earth cooperatively connected with said cartridge for igniting the same.

2. In a landing motor of the class described, the combination of suspension cables, a piston rod in connection with said suspension cables, a piston in connection with said piston rod, a cylinder for said piston, a gas producing cartridge at one end of said cylinder at one side of said piston, and release means including a rod for contacting the earth cooperatively connected with said cartridge for igniting the same, said cylinder and said piston adapted to be positioned in the fuselage of an airplane, and pulleys over which said cables extend permitting said cables to extend angularly with respect to the axis of said cylinder.

3. In a landing motor of the class described, the combination with a cargo of suspension cables, a piston rod in connection with said suspension cables, a piston in connection with said piston rod, a cylinder for said piston, a gas producing cartridge at one end of said cylinder at one side of said piston, and release means supported by said cargo cooperatively connected with said cartridge and engageable with the ground for igniting said cartridge.

4. In a landing motor of the class described the combination with a cargo of suspension cables, a piston rod in connection with said suspension cables, a piston in connection with said piston rod, a cylinder for said piston, a gas producing cartridge at one end of said cylinder at one side of said piston and release means supported by said cargo including a rod for contacting the earth cooperatively connected with said cartridge for igniting the same, said rod for contacting the earth retractable.

5. In a landing motor for an airplane of the class described, the combination of suspension cables, a piston rod in connection with said suspension cables, a piston in connection with said piston rod, a cylinder for said piston, a gas producing cartridge at one end of said cylinder at one side of said piston, and release means including a rod for contacting the earth retractably connected with said airplane and arranged to ignite said cartridge on contact with the earth.

6. In a landing motor for an airplane of the class described, the combination of suspension cables, a piston rod in connection with said suspension cables, a piston in connection with said piston rod, a cylinder for said piston, a gas producing cartridge at one end of said cylinder at one side of said piston, release means including a rod for contacting the earth retractably connected with said airplane and arranged to ignite said cartridge on contact with the earth, and pulleys axially aligned with said piston rod over which said cables extend in angular disposition to the axis of said piston rod.

PREVOST F. SMITH.

REFERENCES CITED

The following references are of record in the file of this patent:

UNITED STATES PATENTS

| Number | Name | Date |
| --- | --- | --- |
| 1,089,408 | Ganderton | Mar. 10, 1914 |
| 1,535,475 | Jeansen | Apr. 28, 1925 |
| 2,386,395 | Hart | Oct. 9, 1945 |

FOREIGN PATENTS

| Number | Country | Date |
| --- | --- | --- |
| 389,007 | Great Britain | Mar. 9, 1933 |
| 540,724 | Great Britain | Oct. 28, 1941 |